(12) United States Patent
Zhu et al.

(10) Patent No.: US 12,517,402 B2
(45) Date of Patent: Jan. 6, 2026

(54) DISPLAY PANEL AND DISPLAY DEVICE

(71) Applicants: Hefei BOE Optoelectronics Technology Co., Ltd., Anhui (CN); BOE Technology Group Co., Ltd., Beijing (CN)

(72) Inventors: Chuanping Zhu, Beijing (CN); Zhengwei Zhu, Beijing (CN); Xiaojie Zhang, Beijing (CN); Xiaofeng Yin, Beijing (CN); Wenjuan Mei, Beijing (CN); Ji Li, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 18/691,917

(22) PCT Filed: Oct. 31, 2022

(86) PCT No.: PCT/CN2022/128614
§ 371 (c)(1),
(2) Date: Mar. 14, 2024

(87) PCT Pub. No.: WO2024/092401
PCT Pub. Date: May 10, 2024

(65) Prior Publication Data
US 2025/0130465 A1    Apr. 24, 2025

(51) Int. Cl.
*G02F 1/1362* (2006.01)
*G02F 1/1368* (2006.01)

(52) U.S. Cl.
CPC .. *G02F 1/136204* (2013.01); *G02F 1/136286* (2013.01); *G02F 1/1368* (2013.01)

(58) Field of Classification Search
CPC ......... G02F 1/136204; G02F 1/136286; G02F 1/1368
See application file for complete search history.

(56) References Cited

U.S. PATENT DOCUMENTS

| | | | |
|---|---|---|---|
| 11,581,386 B2* | 2/2023 | Shu | H10K 59/40 |
| 2015/0255030 A1* | 9/2015 | Watsuda | G09G 3/3685 |
| | | | 345/92 |

FOREIGN PATENT DOCUMENTS

| | | |
|---|---|---|
| CN | 106932990 A | 7/2017 |
| CN | 108711575 A | 10/2018 |
| CN | 110911444 A | 3/2020 |
| CN | 111123591 A | 5/2020 |

OTHER PUBLICATIONS

International Search Report and Written Opinion mailed on Jul. 28, 2023, in corresponding PCT/CN2022/128614, 9 pages.

* cited by examiner

*Primary Examiner* — Anne M Hines
(74) *Attorney, Agent, or Firm* — XSENSUS LLP (57) ABSTRACT

The present disclosure relates to a display panel and a display device. In the display panel, multiple transfer lines are arranged in a layer different from a layer in which first signal lines are located, and the transfer lines are connected to parts of the first signal lines close to bending sections through transfer holes. Multiple transfer holes are close to an edge of a non-display area along a first direction in sequence and are away from the edge of the non-display area along a second direction in sequence.

20 Claims, 5 Drawing Sheets

DISPLAY PANEL AND DISPLAY DEVICE

CROSS-REFERENCE TO RELATED APPLICATION

The present disclosure is the U.S. national phase application of International Application No. PCT/CN2022/128614 filed on Oct. 31, 2022, the content of which is incorporated herein by reference in its entirety for all purposes.

TECHNICAL FIELD

The present disclosure relates to the field of display technology, in particular to a display panel and a display device.

BACKGROUND

An electrostatic ring is a commonly used protective device in the field of display technology. When electronic static discharge (ESD) enters the display panel, the electrostatic ring can prevent the signal line from being burned by ESD.

It should be noted that the information disclosed in the above section is only used to enhance the understanding of the background of the present disclosure, and thus can include information that does not constitute the prior art already known to those of ordinary skill in the art.

SUMMARY

According to one aspect of the present disclosure, a display panel is provided. The display panel has a display area and a non-display area located adjacent to the display area, and includes a first base substrate; multiple first signal lines arranged on a side of the first base substrate, wherein the first signal lines are located in the non-display area and are parallel to an edge of the display area, at least one first signal line includes a first straight section, a bending section, and a second straight section connected in sequence, the first straight section is arranged along a first direction, the second straight section is arranged along a second direction, and the first direction intersects with the second direction; multiple transfer lines arranged in a layer different from a layer in which the multiple first signal lines are located, wherein the multiple transfer lines are connected to parts of first straight sections or second straight sections of the multiple first signal lines close to bending sections through multiple transfer holes, and the multiple transfer holes are close to an edge of the non-display area in sequence along the first direction and away from the edge of the non-display area in sequence along the second direction; and a sealant layer covering the multiple transfer holes.

According to another aspect of the present disclosure, a display device is provided. The display device includes a display panel as described in the above aspect of the present disclosure.

It should be understood that the general description in the above and the detailed description in the following are only illustrative and explanatory, and do not limit the present disclosure.

BRIEF DESCRIPTION OF THE DRAWINGS

The drawings, which are incorporated in and constitute a portion of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

DETAILED DESCRIPTION

Example embodiments will now be described more fully with reference to the drawings. Example embodiments, however, can be embodied in a variety of forms and should not be construed as being limited to embodiments set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Although relative terms such as "up" and "down" are used in this specification to describe the relative relationship between one illustrative component and another illustrative component, these terms are only used for convenience in this specification, for example, according to an example direction described in the drawings. It can be understood that if the illustrative device is flipped so that it is upside down, the component described as "up" will become the component described as "down". When a certain structure is "on" other structures, it may mean that a structure is formed as a whole on the other structures, or a structure is "directly" arranged on the other structures, or a structure is "indirectly" arranged on the other structures through another structure.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms "first", "second", and "third" are only used as reference numerals and are not intended to limit the quantity of objects.

The electrostatic ring is a kind of commonly used protective device in the field of display technology for electronic static discharge (ESD), which usually consists of one or more groups of thin film transistors (TFT). When the electronic static discharge enters the display panel, the electrostatic ring would be burned out first, which indirectly protects the wiring within the display panel, to prevent the electronic static discharge from burning out signal lines.

Figure 1:
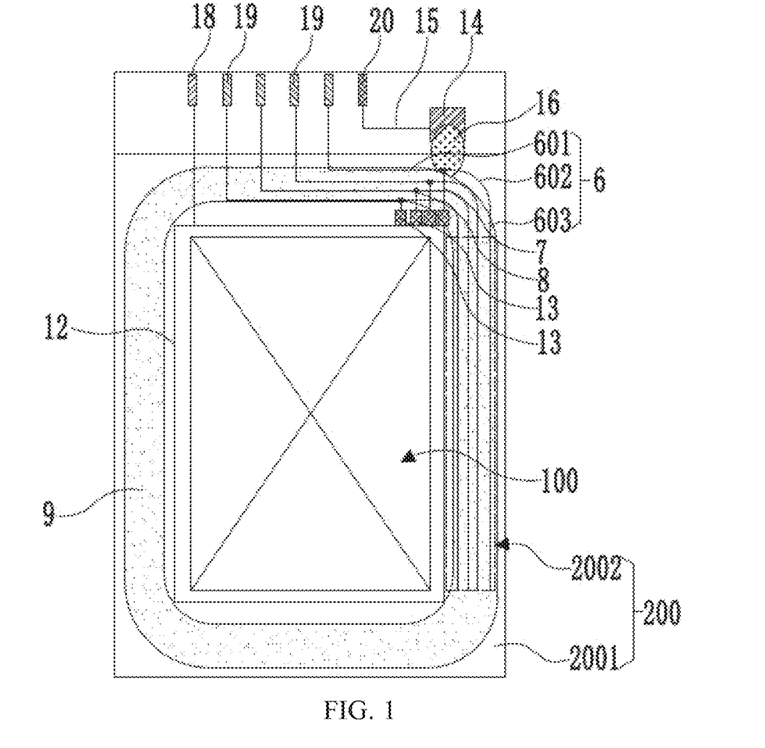
FIG. 1 is a schematic plan view of a display panel involved in embodiments of the present disclosure.
Figure 2:
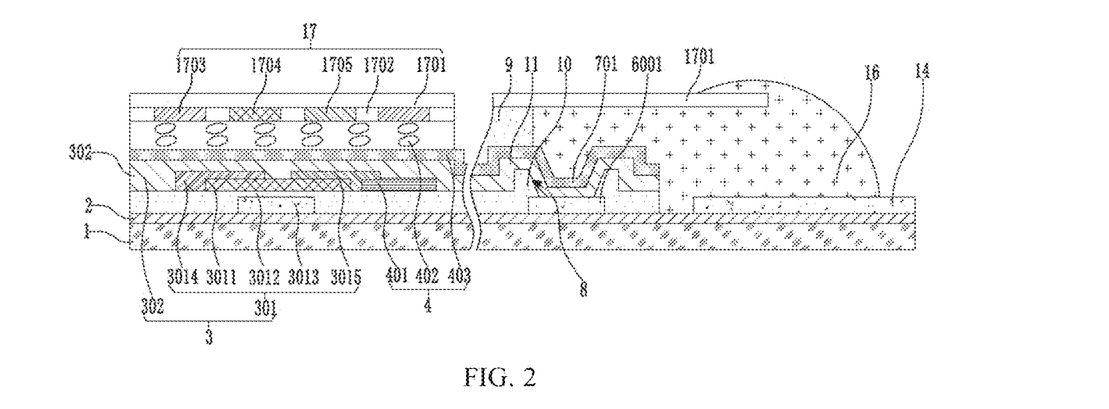
FIG. 2 is a cross-sectional view of a structure of a display panel involved in embodiments of the present disclosure.

As shown in FIGS. 1 and 2, the display panel includes a display area 100 and a non-display area 200 located on the periphery of the display area 100. The non-display area 200 includes a GOA (Gate On Array) area 2002 located around the display area 100 and a peripheral area 2001 located between the GOA area 2002 and an edge of the display panel. A second signal line 12 is arranged around the display area 100 and is located between the display area 100 and the GOA area 2002. Multiple first signal lines 6 are arranged in the GOA area 2002, and the multiple first signal lines 6 are parallel to each other.

The GOA area 2002 is provided with GOA units corresponding to each row of pixels.

The GOA unit usually include a driving thin film transistor, and the multiple first signal lines 6 are all connected to a gate of the driving thin film transistor in the GOA unit. A switch signal is inputted through the first signal line 6, to control turned-on of the driving thin film transistor. A data signal is inputted from a drain of the driving thin film transistor to a pixel electrode. The second signal line 12 is usually connected to a common electrode, so that voltage difference is formed between a driving signal on the common electrode and a driving signal on the pixel electrode, driving a liquid crystal layer of the display panel to emit light.

The peripheral area 2001 of the display panel includes a binding area, and the binding area is provided with multiple first pins 19. The first pins 19 are connected to leading terminals of the first signal lines 6. The binding area are further provided with multiple second pins 18. The second pins 18 is connected to the second signal line 12, and the second signal line 12 is connected to the common electrode.

The switch signal is inputted through the first pin 19, to control the conductivity of an active layer of the driving thin film transistor. The data signal can travel from the source to the drain through the channel region, and finally reach the pixel electrode 401. A reference signal is inputted through the second pin 18, so that an electric field for driving the rotation of the liquid crystal is formed between the pixel electrode 401 and the common electrode. The electric field changes the transmittance of the liquid crystal molecules, achieving the display of different images.

The display panel further includes a grounding part 14 and a grounding line 15. The peripheral area 2001 is not provided with a liquid crystal layer. The grounding part 14 is arranged in the peripheral area 2001, and is between an array substrate and a second base substrate 1701. The grounding part 14 is formed on the array substrate and connected to the second base substrate 1701 through conductive adhesive 16. One end of the grounding line 15 is connected to the grounding part 14, and the other end of the grounding line 15 is connected to a third pin 20. The binding area is further provided with a fourth pin, which is connected to the data signal line for inputting the data signal (not shown in FIG. 1).

In order to provide electronic static discharge protection, multiple electrostatic rings 13 are arranged where the GOA area 2002 is close to a corner of the binding area. The multiple electrostatic rings 13 are respectively connected to the second signal line 12 and the multiple first signal lines 6. The number of electrostatic rings 13 is the same as the number of first signal lines 6. The multiple electrostatic rings 13 are arranged in sequence along a first direction and are connected to the multiple first signal lines 6 through multiple transfer lines 7. The transfer lines 7 extend along a second direction, and lengths of the multiple transfer lines 7 increase in sequence along the first direction.

A connection pattern of multiple electrostatic rings 13, multiple transfer lines 7, and multiple first signal lines 6 will be explained taking FIG. 1 as an example. The four electrostatic rings 13 along the first direction are defined respectively as a first electrostatic ring, a second electrostatic ring, a third electrostatic ring, and a fourth electrostatic ring. The transfer lines 7 distributed along the first direction are defined respectively as a first transfer line, a second transfer line, a third transfer line, and a fourth transfer line. The parts of the first signal lines 6 distributed along the second direction are defined respectively as a first signal subline, a second signal subline, a third signal subline, and a fourth signal subline.

The first electrostatic ring and the first signal subline are connected through the first transfer line, the second electrostatic ring and the second signal subline are connected through the second transfer line, the third electrostatic ring and the third signal subline are connected through the third transfer line, and the fourth electrostatic ring and the fourth signal subline are connected through the fourth transfer line. It can be understood that an electrostatic ring 13 located farthest from an edge of the non-display area 200 along the first direction is connected to a first signal line 6 located farthest from the edge of the non-display area 200 along the second direction through the shortest transfer line 7. An electrostatic ring 13 located closest to the edge of the non-display area 200 along the first direction is connected to a first signal line 6 located closest to the edge of the non-display area 200 along the second direction through the longest transfer line 7. It should be noted that the edge of the non-display area 200 refers to an edge on a side of the non-display area 200 away from the display area.

The transfer line 7 passes through a transfer hole 8 and is connected to the first signal line 6. Based on the connection pattern between the multiple transfer lines 7 and the multiple first signal lines 6, the layout pattern of multiple transfer holes 8 can be determined. The multiple transfer holes 8 approach the edge of the non-display area 200 in sequence along the first direction, and approach the edge of the non-display area 200 in sequence along the second direction. A sealant layer 9 is usually arranged at a location where the first signal line 6, the transfer line 7, and the transfer hole 8 are located, to prevent the transfer hole 8 from being corroded by water vapor or pollutants. However, the current control ability for the coating accuracy of the sealant layer 9 at the corner is poor, especially in the long-term mass production process, where this disadvantage is more evident. When the deviation of the sealant layer 9 exceeds expectations, a transfer hole 8 located closest to the edge of the non-display area 200 will be directly exposed to the air.

The demand for the narrow border product is increasing currently, a lower border of the display device is getting smaller, and the wiring space on the display panel is constantly being compressed, which would significantly increase the risk of exposing of a transfer hole 8. Then during the reliability process, water vapor enters the interior of the display panel through the exposed transfer hole 8, leading to the risk of water vapor corrosion in the interior of the display panel.

In addition, some display panels are provided with a second base substrate 1701 on a display side. In order to release the static electricity generated between the array substrate and the second base substrate 1701, a grounding part 14 and a grounding line 15 are usually arranged, and the static electricity generated is exported through the grounding part 14 and the grounding line 15. However, due to the continuous compression of the wiring space on the display panel, a distance between the grounding part 14 and the electrostatic ring 13 will be shortened, resulting in the exposing of the transfer hole 8 and a short circuit between the electrostatic ring 13 and the grounding part 14.

Embodiments of the present disclosure provide a display panel. As shown in FIGS. 3 to 11, the display panel includes a display area 100 and a non-display area 200 located adjacent to the display area 100. The display panel includes a first base substrate 1, multiple first signal lines 6, multiple transfer lines 7, and a sealant layer 9. The multiple first signal lines 6 are arranged on one side of the first base substrate 1. The first signal lines 6 are arranged in the non-display area 200 and are parallel to an edge of the display area 100. The first signal line 6 includes a first straight section 601, a bending section 602, and a second straight section 603 connected in sequence. The first straight section 601 is arranged along the first direction, and the second straight section 603 is arranged along the second direction. The first direction intersects with the second direction. The multiple transfer lines 7 are arranged in a layer different from a layer in which the multiple first signal lines 6 are located. The multiple transfer lines 7 are connected to parts of the first straight sections 601 or the second straight sections 603 of the multiple first signal lines close to the bending sections 602 through multiple transfer holes 8. The multiple transfer holes 8 are close to the edge of the non-display area 200 in sequence along the first direction, and are away from the edge of the non-display area 200 in sequence along the second direction. The sealant layer 9 covers the multiple transfer holes 8.

In the display panel, the multiple transfer lines 7 are arranged in a layer different from a layer in which the first signal lines 6 are located. The transfer lines 7 are connected to parts of the first signal lines 6 close to the bending sections 602 through multiple transfer holes 8. The multiple transfer holes 8 are arranged close to the edge of the non-display area 200 along the first direction in sequence and away from the edge of the non-display area 200 along the second direction in sequence. The arrangement of the multiple transfer holes 8 is more in line with the coating trajectory of the sealant layer 9. As a result, it can ensure that under the same coating accuracy of the sealant layer 9, the transfer hole 8 located closest to the edge of the non-display area 200 is still within the coverage of the sealant layer 9, and thus effectively reducing the probability of the exposing of via holes due to poor coating accuracy of the sealant layer 9 at the corner, and reducing the occurring risk of short-circuiting between signal lines, or water vapor corrosion during the reliability process.

Figure 3:
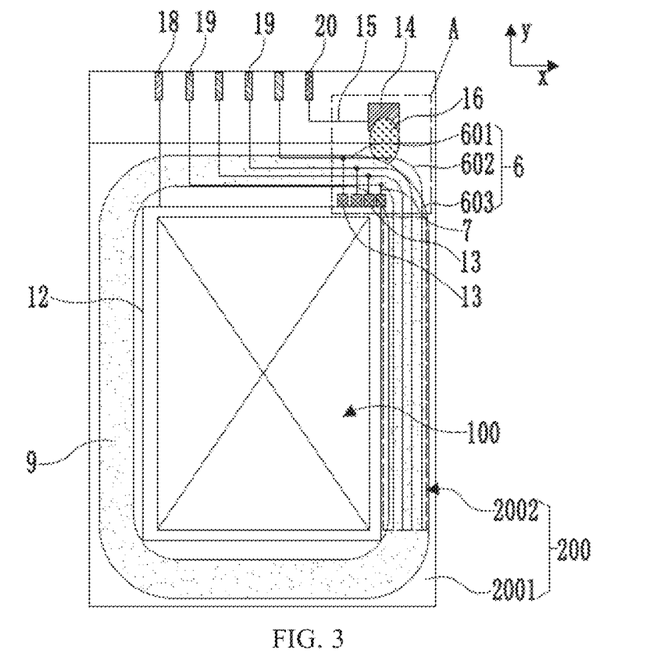
FIG. 3 is a schematic plan view of a display panel according to embodiments of the present disclosure.

It should be noted that the first direction is a direction directed from the first straight section to the bending section, i.e., a direction x shown in FIG. 3, and the second direction is a direction directed from the second straight section to the bending section, i.e., a direction y shown in FIG. 3.

Embodiments illustrate the display panel provided by the present disclosure. Along a thickness direction of the display panel, the display panel can include a first base substrate 1, a driving circuit layer 3, and a pixel layer 4 arranged in stacked manner in sequence. A buffer layer 2 is provided on one side of the first base substrate 1. The driving circuit layer 3 is arranged on a side of the buffer layer 2 away from the first base substrate 1. The pixel layer 4 is arranged on a side of the driving circuit layer 3 away from the first base substrate 1.

The first base substrate 1 can be a substrate made of inorganic materials or organic materials. For example, in some embodiments, the material of the first base substrate 1 can be glass such as sodium-lime glass, quartz glass, sapphire glass, or metal such as stainless steel, aluminum, nickel, etc.

In some embodiments of the present disclosure, the material of the first base substrate 1 can be polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN), or combinations thereof.

In some embodiments of the present disclosure, the first base substrate 1 can also be a flexible substrate, for example, the material of the first base substrate 1 can be polyimide (PI). The first base substrate 1 can also be a composite substrate made of multiple layers of materials. For example, in some embodiments, the first base substrate 1 can include a bottom film layer, a pressure-sensitive sealant layer, a first polyimide layer, and a second polyimide layer arranged in stacked manner in sequence.

The driving circuit layer 3 includes multiple driving circuit areas. Any of the driving circuit areas can include a thin film transistor layer. The thin film transistor layer includes multiple driving thin film transistors 301. The driving thin film transistor 301 can be selected from the top gate thin film transistor, the bottom gate thin film transistor, or the double gate thin film transistor.

The material of an active layer 3011 of the driving thin film transistor 301 can be amorphous silicon semiconductor materials, low-temperature polycrystalline silicon semiconductor materials, metal oxide semiconductor materials, organic semiconductor materials, or other types of semiconductor materials. The driving thin film transistor 301 can be an N-type thin film transistor or a P-type thin film transistor.

The driving thin film transistor 301 can have a first terminal, a second terminal, and a control terminal. One of the first terminal and the second terminal can be a source 3014 of the driving thin film transistor 301, the other can be a drain 3015 of the driving thin film transistor 301, and the control terminal can be a gate of the driving thin film transistor 301. It can be understood that the source 3014 and the drain 3015 of the driving thin film transistor 301 are two terminals relative to each other and interchangeable. When an operation state of the driving thin film transistor 301 changes, for example, when a current direction changes, the source 3014 and the drain 3015 of the driving thin film transistor 301 can be interchanged.

In the present disclosure, the thin film transistor can include an active layer 3011, a gate insulation layer 3012, and a gate 3013 stacked on the first base substrate 1. In some embodiments, a position relationship among film layers can be determined based on a film layer structure of the driving thin film transistor 301.

In some embodiments, the active layer 3011 of the thin film transistor includes a channel region, a source region and a drain region, and the source region and the drain region are located on both sides of the channel region. In some embodiments, the channel region can maintain characteristics of semiconductor materials, and semiconductor materials in the source region and the drain region are partially or completely conductive. The source 3014 and the drain 3015 are electrically connected to the source region and the drain region of the thin film transistor, respectively.

The driving circuit layer 3 can further include a protection layer 302, which can be provided as one or multiple layers depending on different situations. The protection layer 302 can be arranged on a side where the source 3014 and the drain 3015 of the driving transistor are away from the first base substrate 1, and a surface of the protection layer 302 away from the first base substrate 1 is flat.

The bottom gate thin film transistor is taken as an example. In some embodiments of the present disclosure, the driving circuit layer 3 can include a gate 3013, a gate insulation layer 3012, an active layer 3011, and a source and drain, arranged in stacked manner in sequence. The source and drain includes a source 3014 and a drain 3015.

A pixel layer 4 can be provided on a side of the protection layer 302 away from the first base substrate 1. The pixel layer 4 includes a common electrode 403 and a pixel electrode 401. The pixel electrode 401 can be arranged in the same layer as the drain 3015 of the thin film transistor corresponding thereto, and connected to the drain 3015 of the thin film transistor corresponding thereto in the same layer. The common electrode 403 is arranged on a side of the protection layer 302 away from the first base substrate 1. It can be understood that arrangement of the pixel electrode 401 in the same layer as the source and drain can significantly reduce the overall thickness of the display panel.

A liquid crystal layer 402 is provided on a side of the pixel electrode 401 away from the first base substrate 1. Both the pixel electrode 401 and the common electrode 403 have driving surfaces, and thus the liquid crystal layer 402 can be considered to be located between the pixel electrode 401 and the common electrode 403. An opposing substrate 17 is arranged on a side of the liquid crystal layer 402 away from the first base substrate 1.

The opposing substrate 17 typically includes a second base substrate 1701. A first light filtering part 1703, a second light filtering part 1704, and a third light filtering part 1705 that are patterned are provided on a side of the second base substrate 1701 close to the display area. Shading parts 1702 are provided between the first light filtering part 1703 and the second light filtering part 1704, as well as between the second light filtering part 1704 and the third light filtering part 1705.

The first light filtering part 1703 has a red color resistance pattern, the second light filtering part 1704 has a green color resistance pattern, and the third light filtering part 1705 has a blue color resistance pattern. After being filtered through the opposing substrate, the light can be changed from monochromatic light to colored light.

Figure 4:
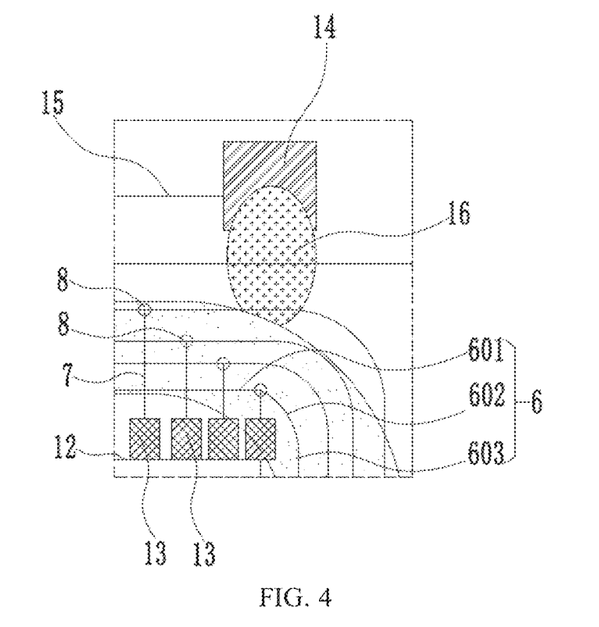
FIG. 4 is a partial enlarged view of part A in FIG. 3.

As shown in FIGS. 3 and 4, the display panel includes a display area 100 and a non-display area 200 located on the periphery of the display area 100. The non-display area 200 includes a GOA (Gate On Array) area 2002 located around the display area 100 and a peripheral area 2001 located between the GOA area 2002 and an edge of the display panel. The GOA area 2002 is provided with a second signal line 12 and multiple first signal lines 6. The second signal line 12 is arranged around the display area 100, the multiple first signal lines 6 are arranged on a side of the second signal line 12 away from the display area 100, and the multiple first signal lines 6 are parallel to each other.

Multiple electrostatic rings 13 are connected between the second signal line 12 and the multiple first signal lines 6. In some embodiments, the second signal line 12 and the first signal lines 6 are arranged in the same layer, and transfer lines 7 are arranged in a layer different from a layer in which the first signal lines 6 are located. The electrostatic rings 13 are bridged with the second signal line 12 and the first signal line 6. In some embodiments, the electrostatic rings 13 are connected to the multiple first signal lines 6 through multiple transfer lines 7.

The arrangement patterns of the first signal lines 6, the transfer lines 7, and the electrostatic rings 13 have been explained in the above sections, and will not be further elaborated here. As shown in FIGS. 3 and 4, a length of the first transfer line, a length of the second transfer line, a length of the third transfer line, and a length of the fourth transfer line decrease along the first direction in sequence. The first electrostatic ring is connected to the fourth signal subline through the first transfer line, the second electrostatic ring is connected to the third signal subline through the second transfer line, the third electrostatic ring is connected to the second signal subline through the third transfer line, and the fourth electrostatic ring is connected to the first signal subline through the fourth transfer line.

It can be understood that the electrostatic ring 13 located farthest from the edge of the non-display area 200 along the first direction is connected to the first signal line 6 located closest to the edge of the non-display area 200 along the second direction through the longest transfer line 7. The electrostatic ring 13 located closest to the edge of the non-display area 200 along the first direction is connected to the first signal line 6 located farthest from the edge of the non-display area 200 along the second direction through the shortest transfer line 7.

In some embodiments, the first signal line 6 includes a first straight section 601, a bending section 602, and a second straight section 603 connected in sequence. The first straight section 601 is arranged along the first direction, and the second straight section 603 is arranged along the second direction. The first direction intersects with the second direction. The transfer line 7 is connected to the first straight section 601 or the second straight section 603.

The transfer line 7 can extend along the second direction and connected to the first straight section 601 through the transfer hole 8, or the transfer line 7 can extend along the first direction and connected to the second straight section 603 through the transfer hole 8. The bending section 602 is located close to a corner of the non-display area 200. The electrostatic ring 13 is generally arranged at a corner of the GOA area 2002 close to the binding area. Therefore, the multiple transfer holes 8 are arranged close to the bending sections 602 of the first signal lines 6.

Multiple transfer holes 8 are arranged close to the edge of the non-display area 200 along the first direction and away from the edge of the non-display area 200 along the second direction. In some embodiments, the sealant layer 9 is arranged at where the first signal line 6, the transfer line 7, and the transfer hole 8 are located. The arrangement of the multiple transfer holes 8 is more in line with the coating trajectory of the sealant layer 9. As a result, under the same coating accuracy of the sealant layer 9, the transfer holes 8 can be prevented from being corroded by water vapor or pollutants.

A distance between two transfer holes 8 adjacent along the first direction can be equal to a first constant, and a distance between two transfer holes 8 adjacent along the second direction can be equal to a second constant, so that the multiple transfer holes 8 can be located in a straight line segment, which, as can be understood, is more conducive to determination of an arranged position of the transfer hole 8. It should be noted that the multiple transfer holes 8 can also be located in an arc-shaped line segment. That is, the distance between two transfer holes 8 adjacent along the first direction is changeable, and the distance between two transfer holes 8 adjacent along the second direction is changeable.

When the transfer line 7 extends along the second direction, the grounding part 14 is located along the second direction, and is on a side where the transfer hole 8 is away from the display area. An orthographic projection of the sealant layer 9 on the first base substrate 1 covers an orthographic projection of the transfer hole 8 on the first base substrate 1, and an orthographic projection of the conductive adhesive 16 on the first base substrate 1 does not overlap with the orthographic projection of the transfer hole 8 on the first base substrate 1. Even if the conductive adhesive 16 has fluidity, and some of the conductive adhesive 16 diffuses along the second direction to the periphery of the sealant, the occurring risk of short-circuiting between the grounding line 15 and the first signal line 6 can be eliminated, due to completely sealing on the transfer hole 8 by the sealant.

Figure 5:
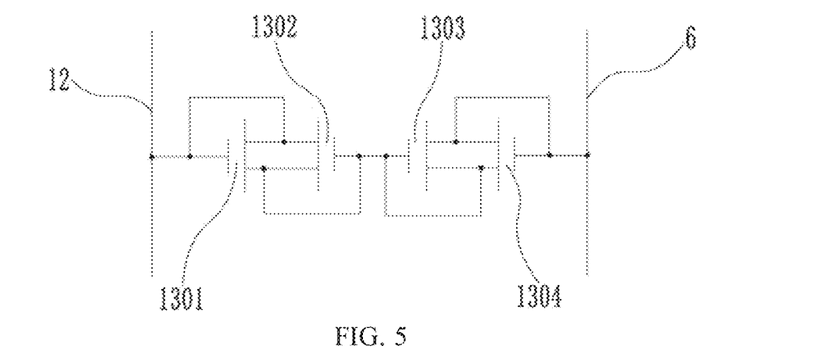
FIG. 5 is a schematic circuit diagram of an electrostatic ring according to embodiments of the present disclosure.

As shown in FIG. 5, the electrostatic ring 13 is typically composed of one or more groups of transistors. When the electronic static discharge enters the display panel, the electrostatic ring 13 would be burned out first, which indirectly protects the wiring within the display panel, to prevent the electronic static discharge from burning out signal lines. In some embodiments, the electrostatic ring 13 can include a first protective thin film transistor 1301, a second protective thin film transistor 1302, a third protective thin film transistor 1303, and a fourth protective thin film transistor 1304.

A gate of the first protective thin film transistor 1301 is connected to a source of the first protective thin film transistor 1301 and the second signal line 12. A source of the second protective thin film transistor 1302 is connected to a drain of the first protective thin film transistor 1301, and a gate of the second protective thin film transistor 1302 is connected to a drain of the second protective thin film transistor 1302. A gate of the third protective thin film transistor 1303 and a source of the third protective thin film transistor 1303 are connected to the gate of the second protective thin film transistor 1302. A source of the fourth protective thin film transistor 1304 is connected to a drain of the third protective thin film transistor 1303, a gate of the fourth protective thin film transistor 1304 is connected to a drain of the fourth protective thin film transistor 1304 and the first signal line 6.

As shown in FIGS. 6 to 10, an insulation layer group is arranged between the transfer lines 7 and the first signal lines 6. The first signal lines 6 are located on one side of the first base substrate 1. The insulation layer group is arranged on a side of the first signal lines 6 away from the first base substrate 1. The transfer holes 8 pass through the insulation layer group and expose at least a portion of the first signal lines 6. The first signal lines 6 are located on one side of the first base substrate 1, and the transfer lines 7 are located on a side of the insulation layer group away from the first base substrate 1. A portion of the transfer line 7 is located on a side of the first signal line 6 away from the first base substrate 1.

It should be noted that the insulation layer group includes a first insulation layer 10 and a second insulation layer 11 stacked in sequence along a direction away from a side of the first base substrate 1. The first insulation layer 10 is arranged on a side of the first signal lines 6 away from the first base substrate 1. The second insulation layer 11 is arranged on a side of the first insulation layer 10 away from the first base substrate 1. The first insulation layer 10 is provided with a first transfer subhole, and the second insulation layer 11 is provided with a second transfer subhole. An orthographic projection of the first transfer subhole on the first base substrate 1 is located within an orthographic projection of the second transfer subhole on the first base substrate 1.

Figure 6:
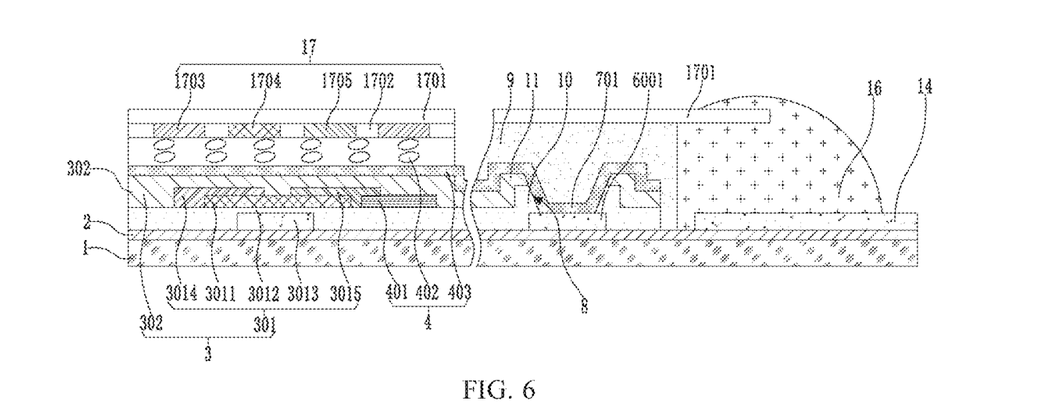
FIG. 6 is a schematic cross-sectional view of a display panel according to embodiments of the present disclosure.

As shown in FIG. 6, the first signal line 6 can include a first conductive part 6001, and the first conductive part 6001 is arranged on one side of the first base substrate 1. The transfer line 7 can include a first transfer part 701, and the first transfer part 701 is arranged on a side of the first conductive part 6001 away from the first base substrate 1. The first transfer part 701 extends along sidewalls of the first transfer subhole and the second transfer subhole, and covers a side of the second insulation layer 11 away from the first base substrate 1. The first conductive part 6001 and the gate are arranged in the same layer. The first insulation layer 10 and the gate insulation layer 3012 are arranged in the same layer, and the second insulation layer 11 and the protection layer 302 are arranged in the same layer. The first transfer part 701 and the common electrode 403 can be arranged in the same layer.

Figure 7:
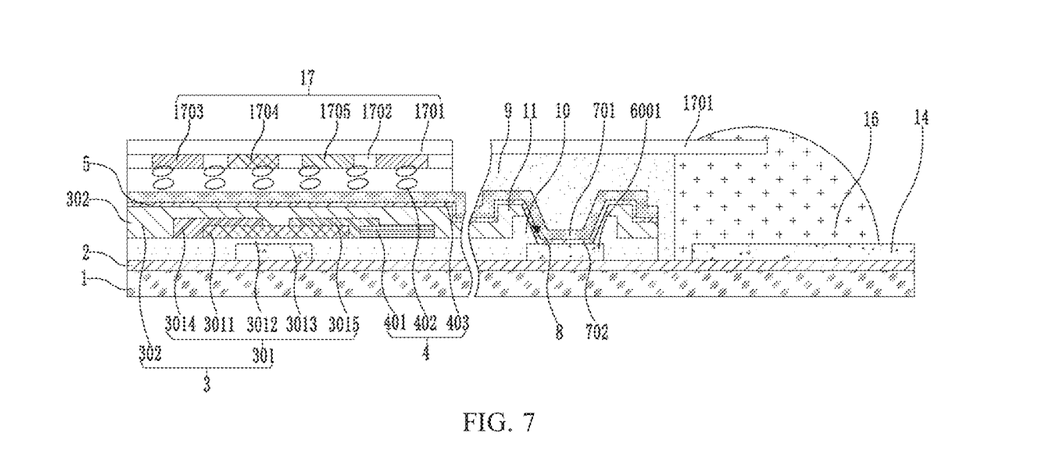
FIG. 7 is a schematic cross-sectional view of a display panel according to embodiments of the present disclosure.
Figure 8:
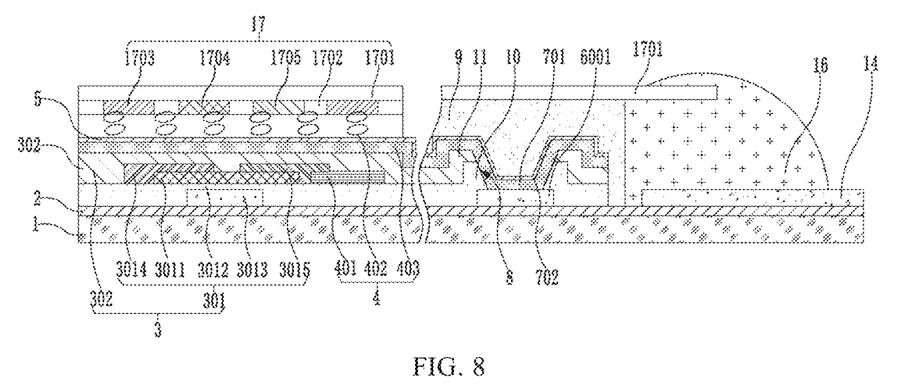
FIG. 8 is a schematic cross-sectional view of a display panel according to embodiments of the present disclosure.

As shown in FIG. 7, a second transfer part 702 is further provided on the basis of FIG. 6. The transfer line 7 further includes a second transfer part 702. The second transfer part 702 is located between the first conductive part 6001 and the first transfer part 701, and extends along the side walls of the first transfer subhole and the second transfer subhole and extends to be located between the second insulation layer 11 and the first transfer part 701. The second transfer part 702 and a first metal layer 5 are arranged in the same layer. As shown in FIG. 8, in some embodiments, the second transfer part 702 can also be arranged on a side of the first transfer part 701 away from the first base substrate 1.

The first metal layer 5 can be a reflective metal layer. When light is incident on the reflective metal layers, rotation angles of liquid crystal particles are controlled by controlling a voltage between the pixel electrode 401 and the common electrode 403, so as to control the light transmittance at different parts of the display panel and display an image.

The display panel where the second transfer part 702 is closer to the first base substrate 1 than the first transfer part 701 is typically applied to an electronic paper display device. The display panel where the second transfer part 702 is located on a side of the first transfer part 701 away from the first base substrate 1 is typically applied to a reflective liquid crystal display (RLCD).

It should be noted that the first metal layer 5 is not limited to the reflective metal layer, but can also be the pixel electrode 401, as long as it is located on a side of the gate away from the first base substrate 1, which will not be elaborated here.

Figure 9:
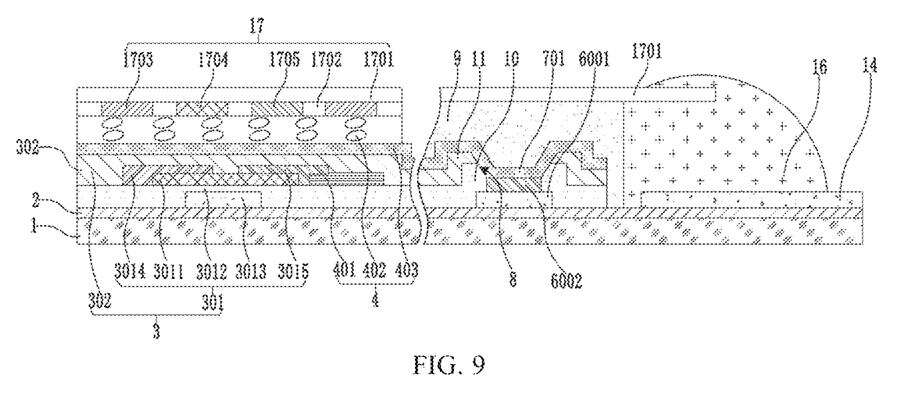
FIG. 9 is a schematic cross-sectional view of a display panel according to embodiments of the present disclosure.
Figure 10:
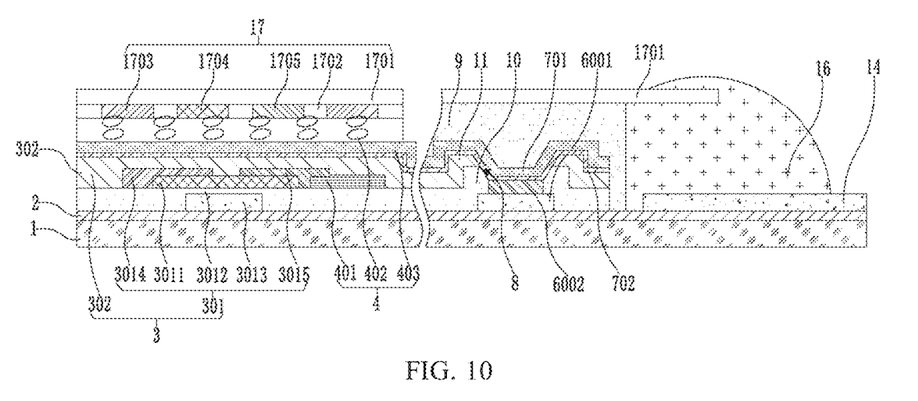
FIG. 10 is a schematic cross-sectional view of a display panel according to embodiments of the present disclosure.

As shown in FIGS. 9 and 10, the first signal line 6 can further include a second conductive part 6002, which is arranged between the first transfer part 701 and the first conductive part 6001. The second conductive part 6002 and the source and drain are arranged in the same layer. The transfer line 7 can include the first transfer part 701 only, or the transfer line 7 can also include both the first transfer part 701 and the second transfer part 702. The second transfer part 702 can be located between the first transfer part 701 and the second conductive part 6002, or the second transfer part 702 can be located on a side of the first transfer part 701 away from second conductive part 6002, which is not specifically limited here. It can be understood that the cross-sectional area of the first signal line 6 can be increased by adding the second conductive part 6002 onto the first conductive part 6001, which is conducive to reducing the resistance of the first signal line 6.

In the above embodiments, a side of the transfer holes 8 away from the first base substrate 1 is a metal layer, and thus the occurring risk of short-circuiting between the first signal line 6 and the grounding line 15, as well as corrosion of the first signal line 6 remains high.

Figure 11:
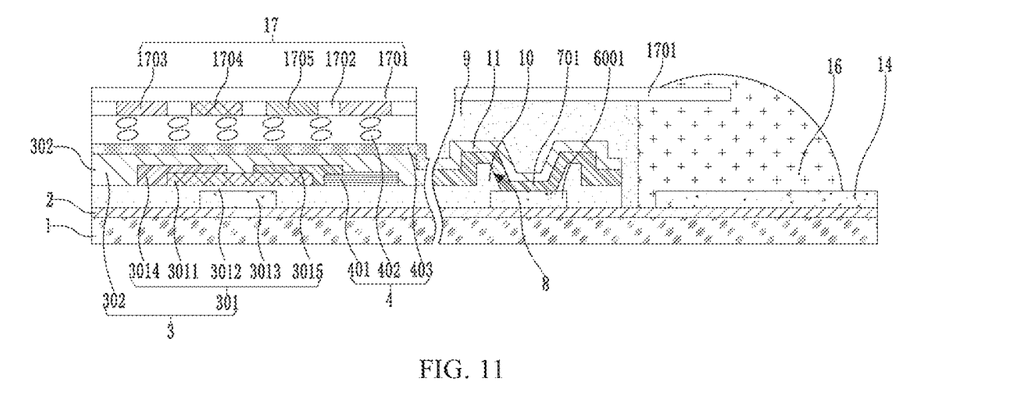
FIG. 11 is a schematic cross-sectional view of a display panel according to embodiments of the present disclosure.

As shown in FIG. 11, the first signal line 6 is arranged on one side of the first base substrate 1. The first insulation layer 10 is arranged on a side of the first signal line 6 away from the first base substrate 1. The transfer line 7 is arranged on a side of the first insulation layer 10 away from the first base substrate 1. The transfer hole 8 passes through the first insulation layer 10 and exposes at least a portion of the first signal line 6. The transfer line 7 is located on a side of the first insulation layer 10 away from the first base substrate 1, and a portion of the transfer line 7 is located on a side of the first signal line 6 away from the first base substrate 1. The second insulation layer 11 is arranged on a side of the transfer line 7 away from the first base substrate 1.

The first signal line 6 includes a first conductive part 6001, and the first conductive part 6001 and the gate 3013 are arranged in the same layer. The transfer line includes a first transfer part, and the first transfer part 701 and the source and drain are arranged in the same layer. The first insulation layer 10 and the gate insulation layer 3012 are arranged in the same layer, and the second insulation layer 11 and the protection layer 302 are arranged in the same layer.

A side of the transfer line 7 away from the first base substrate 1 is protected by the second insulation layer 11, which greatly reduces the occurring risk of short-circuiting between the first signal line 6 and the grounding line 15, as well as corrosion of the first signal line 6.

It should be noted that the display panel provided in embodiments of the present disclosure is not limited to be applied to the amorphous silicon liquid crystal display (a-Si TFT-LCD), but can also be applied to the low-temperature polycrystalline silicon liquid crystal display (LTPS-TFT LCD), and can alternatively be applied to the organic light-emitting diode (OLED) display.

Embodiments of the present disclosure provide a display device. The display device can include a display panel as described in any of the above embodiments. The beneficial effects of the display device can refer to the beneficial effects of the display panel, which will not be elaborated here.

It should be noted that in addition to the display panel, the display device can further include other necessary parts and components. For example, a display further includes components such as a casing, a circuit board, a power cord, etc. Those skilled in the art can supplement accordingly according to specific requirements for using the display device, which will not be elaborated here.

The display device can be a traditional electronic device such as a mobile phone, a computer, a television, and a camcorder, as well as emerging wearable devices such as VR glasses, which will not be elaborated here.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A display panel having a display area and a non-display area located adjacent to the display area, wherein the display panel comprises:
   a first base substrate;
   multiple first signal lines arranged on a side of the first base substrate, wherein the first signal lines are located in the non-display area and are parallel to an edge of the display area, at least one first signal line comprises a first straight section, a bending section, and a second straight section connected in sequence, the first straight section is arranged along a first direction, the second straight section is arranged along a second direction, and the first direction intersects with the second direction;
   multiple transfer lines arranged in a layer different from a layer in which the multiple first signal lines are located, wherein the multiple transfer lines are connected to parts of first straight sections or second straight sections of the multiple first signal lines close to bending sections through multiple transfer holes, and the multiple transfer holes are close to an edge of the non-display area in sequence along the first direction and away from the edge of the non-display area in sequence along the second direction; and
   a sealant layer covering the multiple transfer holes.

2. The display panel according to claim 1, wherein a distance between two transfer holes adjacent along the first direction is equal to a first constant, and a distance between two transfer holes adjacent along the second direction is equal to a second constant.

3. The display panel according to claim 1, further comprising multiple driving thin film transistors, a pixel electrode, and a common electrode, wherein at least one driving thin film transistor comprises a gate, a gate insulation layer, a source and drain, and a protection layer.

4. The display panel according to claim 3, wherein an insulation layer group is arranged on a side of the first signal lines away from the first base substrate, the insulation layer group comprises a first insulation layer and a second insulation layer stacked in sequence along a direction away from the side of the first base substrate, the transfer holes pass through the insulation layer group and expose at least a portion of the first signal lines, the transfer lines are located on a side of the insulation layer group away from the first base substrate, and a portion of the transfer lines are located on a side of the first signal lines away from the first base substrate.

5. The display panel according to claim 4, wherein at least one first signal line comprises a first conductive part, the first conductive part and the gate are arranged in the same layer, at least one transfer line comprises a first transfer part, and the first transfer part and the common electrode are arranged in the same layer, and wherein the first insulation layer and the gate insulation layer are arranged in the same layer, and the second insulation layer and the protection layer are arranged in the same layer.

6. The display panel according to claim 5, further comprising a first metal layer arranged between the gate and the common electrode, wherein the at least one transfer line further comprises a second transfer part, the second transfer part is arranged between the first conductive part and the first transfer part as well as between the insulation layer group and the first transfer part, and the second transfer part and the first metal layer are arranged in the same layer.

7. The display panel according to claim 5, further comprising a first metal layer arranged on a side of the common electrode away from the first base substrate, wherein the at least one transfer line further comprises a second transfer part, the second transfer part is arranged on a side of the first transfer part away from the first base substrate, and the second transfer part and the first metal layer are arranged in the same layer.

8. The display panel according to claim 5, wherein the at least one first signal line further comprises a second conductive part arranged between the first transfer part and the first conductive part, and the second conductive part and the source and drain are arranged in the same layer.

9. The display panel according to claim 4, wherein at least one transfer hole comprises a first transfer subhole and a second transfer subhole, the first transfer subhole is formed in the first insulation layer, the second transfer subhole is formed in the second insulation layer, and an orthographic projection of the first transfer subhole on the first base substrate is located within an orthographic projection of the second transfer subhole on the first base substrate.

10. The display panel according to claim 3, wherein a first insulation layer is arranged on a side of the first signal lines away from the first base substrate, the transfer holes pass through the first insulation layer and expose at least a portion of the first signal lines, the transfer lines are located on a side of the first insulation layer away from the first base substrate and a portion of the transfer lines are located on a side of the first signal lines away from the first base substrate, and a second insulation layer is arranged on a side of the transfer lines away from the first base substrate.

11. The display panel according to claim 10, wherein at least one first signal line comprises a first conductive part, the first conductive part and the gate are arranged in the same layer, at least one transfer line comprises a first transfer part, and the first transfer part and the source and drain are arranged in the same layer, and wherein the first insulation layer and the gate insulation layer are arranged in the same layer, and the second insulation layer and the protection layer are arranged in the same layer.

12. The display panel according to claim 3, further comprising a second signal line and multiple electrostatic rings, wherein the second signal line is located between the display area and the electrostatic rings, the second signal line is arranged around the display area, and the second signal line is connected to the multiple first signal lines through the multiple electrostatic rings.

13. The display panel according to claim 12, wherein the electrostatic rings and the driving thin film transistors are arranged in the same layer, and at least one electrostatic ring comprises:
  a first protective thin film transistor, wherein a gate of the first protective thin film transistor is connected to a source of the first protective thin film transistor and the second signal line;
  a second protective thin film transistor, wherein a source of the second protective thin film transistor is connected to a drain of the first protective thin film transistor, and a gate of the second protective thin film transistor is connected to a drain of the second protective thin film transistor;
  a third protective thin film transistor, wherein a gate of the third protective thin film transistor and a source of the third protective thin film transistor are connected to the gate of the second protective thin film transistor; and
  a fourth protective thin film transistor, wherein a source of the fourth protective thin film transistor is connected to a drain of the third protective thin film transistor, and a gate of the fourth protective thin film transistor is connected to a drain of the fourth protective thin film transistor and the first signal line.

14. The display panel according to claim 13, wherein the multiple transfer lines are distributed along the first direction, an electrostatic ring located farthest from the edge of the non-display area along the first direction is connected to a first signal line located closest to the edge of the non-display area along the second direction through the longest transfer line, and an electrostatic ring located closest to the edge of the non-display area along the first direction is connected to a first signal line located farthest from the edge of the non-display area along the second direction through the shortest transfer line.

15. The display panel according to claim 13, wherein the multiple transfer lines are distributed along the second direction, an electrostatic ring located farthest from the edge of the non-display area along the second direction is connected to a first signal line located closest to the edge of the non-display area along the first direction through the longest transfer line, and an electrostatic ring located closest to the edge of the non-display area along the second direction is connected to a first signal line located farthest from the edge of the non-display area along the first direction through the shortest transfer line.

16. The display panel according to claim 3, wherein the pixel electrode and the source and drain are arranged in the same layer.

17. The display panel according to claim 1, further comprising a grounding line and a second base substrate, wherein the grounding line is connected to the second base substrate through conductive adhesive, and an orthographic projection of the conductive adhesive on the first base substrate does not overlap with orthographic projections of the transfer holes on the first base substrate.

18. A display device comprising the display panel according to claim 1.

19. The display panel according to claim 1, wherein lengths of the multiple transfer lines decrease along the first direction or the second direction in sequence.

20. The display panel according to claim 1, wherein a distance between two transfer holes adjacent along the first direction and a distance between two transfer holes adjacent along the second direction are changeable.

* * * * *